United States Patent [19]

Noonan et al.

[11] Patent Number: 5,204,814
[45] Date of Patent: Apr. 20, 1993

[54] AUTONOMOUS LAWN MOWER

[75] Inventors: Thomas H. Noonan, Havertown; John Fisher, Avondale, both of Pa.; Barry Bryant, New Baltimore, Mich.

[73] Assignee: Mobot, Inc., Havertown, Pa.

[21] Appl. No.: 611,679

[22] Filed: Nov. 13, 1990

[51] Int. Cl.[5] .......................... G06F 15/50; B62D 1/28
[52] U.S. Cl. ................................ 364/424.02; 180/168
[58] Field of Search ....................... 364/424.01, 424.02; 180/167-170

[56] References Cited

U.S. PATENT DOCUMENTS

| | | | |
|---|---|---|---|
| 3,095,939 | 4/1960 | Hine | 180/167 |
| 3,482,644 | 12/1969 | Krieger et al. | 180/79.1 |
| 3,550,714 | 10/1964 | Bellinger | 180/79.1 |
| 3,563,327 | 11/1968 | Mier | 18/79.1 |
| 3,734,229 | 5/1973 | Comer | 180/98 |
| 3,800,902 | 4/1974 | Keller | 180/79.1 |
| 4,028,454 | 12/1986 | Ito | 364/424.02 |
| 4,119,900 | 10/1978 | Kremnitz | 318/587 |
| 4,137,984 | 2/1979 | Jennings et al. | 180/98 |
| 4,306,329 | 12/1981 | Yokoi | 180/167 |
| 4,530,056 | 7/1985 | Mackinnon et al. | 364/424.02 |
| 4,626,993 | 12/1986 | Okuyama et al. | 364/424.02 |
| 4,679,152 | 7/1987 | Perdue | 364/424.02 |
| 4,694,639 | 9/1987 | Chen et al. | 56/10.2 |
| 4,730,690 | 3/1988 | McNutt et al. | 180/274 |
| 4,742,283 | 5/1988 | Bolger et al. | 318/587 |
| 4,800,978 | 1/1989 | Wasa et al. | 180/168 |
| 4,847,774 | 7/1989 | Tomikawa et al. | 364/449 |
| 4,990,841 | 5/1991 | Elder | 318/587 |
| 4,993,507 | 2/1991 | Ohkura | 364/426.01 |

OTHER PUBLICATIONS

The Lawn Ranger Rescues the Weekend, "Electronic House", Sep./Oct. 1990, p. 32.

*Primary Examiner*—Thomas G. Black
*Attorney, Agent, or Firm*—Sixbey, Friedman, Leedom & Ferguson

[57] ABSTRACT

Disclosed is an automatic, self propelled lawn mower that references its position within a cutting area using electronically stored path and terrain information as a primary navigation system, senses a non magnetic, non-current carrying metallic guide path as a secondary navigation system, senses underground metallic references for use as position reference points as a further navigation system, incorporates an ultrasonic obstacle detection system to stop the vehicle if unexpected obstacles are encountered. The vehicle further includes a cow-catcher front bumper arrangement to divert small objects away from the cutting blades, contains bumper switches to shut off the vehicle upon contact with large objects, contains an inclinometer sensor to halt the vehicle during unexpected tilting, incorporates a radio communications link to notify an off-board monitoring system of problems, contains an on-board power generation system using an internal combustion engine, generator, and a battery arrangement. The lawn mower also provides a navigation controller and servo motor positioning system that plans path motion, using sensory data and stored map data and to turn the drive wheels to propel the vehicle in the desired manner.

28 Claims, 7 Drawing Sheets

DIRECTION OF TRAVEL

FIG. 2B

SENSOR NUMBER

| | s1 | s2 | s3 | s4 |
|---|---|---|---|---|
| d1 | 0 | 0 | 0 | 0 |
| d2 | 0 | 1 | 0 | 0 |
| d3 | 0 | 1 | 1 | 0 |
| d4 | 1 | 1 | 1 | 0 |
| d5 | 1 | 1 | 1 | 1 |
| d6 | 1 | 1 | 1 | 1 |
| d7 | 0 | 0 | 0 | 0 |

DISTANCE

SENSOR VALUES

FIG. 3

PATH DIRECTION

AUTONOMOUS LAWN MOWER

FIELD OF THE INVENTION

The present invention relates in general to self-propelled, fully automatic vehicles, and more specifically to a computer controlled, self guiding, autonomous lawn mower with an onboard power generation system, sensory systems, computer controlled navigation system and safety systems.

BACKGROUND OF THE INVENTION

Self guided lawn mowers, as well as navigation systems in which a vehicle follow a guide path are known in the art. U.S. Pat. No. 4,679,152, issued to Perdue discloses a navigation system and method for guiding a mobile robot employing a plurality of sensors that relates to guiding a vehicle to a charging station. Such a guiding system is used to allow a mobile robot to detect and mate with a floating charging unit and does not relate to the guidance of a unit about a predetermined path in order to cover an entire area.

U.S. Pat. No. 4,137,984 issued to Jennings et al. and U.S. Pat. No. 4,730,690 issued to McNutt et al., each disclose bumper mechanisms to prevent forceful collisions with obstacles but which are not intended or optimized for lawn mowers. These devices sense the presence of objects and guide the vehicle around such objects. Again, however, such devices do not relate to the guidance of a unit about a predetermined path in order to cover an entire area.

Numerous patents exists describing navigation systems where vehicles and transporters follow a wire or guide path. For instance, U.S. Pat. No. 4,800,978 issued to Wasa discloses a strip of magnetic material which is detected by detection circuits. Similarly, U.S. Pat. No. 4,742,283 issued to Bolger, U.S. Pat. No. 3,482,644 issued to Krieger et al., U.S. Pat. No. 3,563,327 issued to Mier, and U.S. Pat. No. 3,734,229 issued to Comer describe additional guidance systems. Each of these systems, however, require either a permanent magnet or an electricity conducting electromagnet as a guide path, and they do not discuss a system for following a passive guide path.

U.S. Pat. Nos. 3,800,902 to Keller, 3,550,714 to Bellinger, and 3,095,939 to Hine each disclose automated lawn mowers which use a variety of navigation systems. However, these systems do not include following a buried underground metallic path or a navigation system which includes a marker identification system. U.S. Pat. No. 4,694,639 issued to Chen et al. discloses a robotic lawn mower wherein the path or route is stored in a memory device but does not consider or disclose a system capable of accurately recalibrating the vehicles position to actual landmarks along its path of travel.

Clearly, there is a need for a navigation system for guiding an automatic lawn mower which is capable of recalibrating the units position along a guide path and correct the misalignment of the unit.

SUMMARY OF THE INVENTION

An autonomous lawn mower (MOBOT TM) in accordance with the present invention is a self contained, self powered, and self navigating vehicle designed primarily for lawn mowing although its design is applicable to other repetitive lawn and garden functions such as dispensing fertilizers and the like. The autonomous lawn mower, also referred to in this disclosure as lawn mower and vehicle, consists of a structural chassis, cutting apparatus, gas engine, generator, batteries, electric drive motors, navigation sensors, control computer, and safety systems. The autonomous lawn mower drives along a predetermined cutting path by steering itself using a stored map depicting the lawn surface. The cutting route is stored in the autonomous lawn mower's computer memory as a collection of path vectors and arcs. In addition, terrain and navigation information is also stored in the map database. During cutting operations, the autonomous lawn mower attempts to traverse a given stored route by controlling its drive motors to move the vehicle in either straight lines or arcs that describe path segments comprising the cutting route. Navigating purely from the stored map information, however, is not sufficient to precisely control the vehicle. Factors such as wheel slippage, mechanical inaccuracies, and control errors, which produce cumulative position errors, may eventually cause the vehicle to deviate from its programmed route. Consequently, in order to maintain correct cutting over the entire travel route, the autonomous lawn mower includes methods to recalibrate its position with actual reference points in the lawn.

Position referencing is accomplished by comparing the vehicles perceived position and operating state, derived from sensory data, with information it expects from its stored map. The autonomous lawn mower determines its actual position by identifying underground metallic references placed at specific locations in the lawn. Once a reference is located, the autonomous lawn mower finds the position coordinates of the reference from its stored map and recalibrates its own position for further navigation. Alternately, the autonomous lawn mower has the ability to follow an underground metallic guide path. This is used when a very precise route must be maintained. Metallic references and guide paths are passive meaning that they do not conduct electric current or act as magnets. Since guide paths and references do not require electric power, they can be easily installed or removed. The guide paths and references are detected with an array of inductive metal detector sensors mounted near the front of the vehicle. Each element signals the presence of a metallic target (i.e. a guide path or reference) directly beneath it. Since multiple sensors are spaced across the width of the vehicle, the locations of the metallic targets with respect to the vehicle can be determined.

The map information is stored in a database within the vehicles' control system. It provides the autonomous lawn mower with knowledge of the approaching terrain so it can slow down before negotiating difficult cutting areas (i.e. hills, sharp turns, etc.). The autonomous lawn mower monitors differences between the information contained in the map database and the sensed position of guidepaths and references and automatically shuts itself off if a correlation can not be made, signifying that the autonomous lawn mower is lost. This feature prohibits the autonomous lawn mower from deviating from its stored path more then a short distance.

The autonomous lawn mower includes two front drive wheels and two non powered trailing wheels which swivel. Both front wheels are powered by their own electric servo gear motor. A computer synchronizes the motors to move the vehicle in the desired direction. Actuating the drive wheels in the same direction but at different speeds causes the vehicle to turn at a given radius. Driving the wheels in opposite direction pivots the vehicle to quickly change its direction. The chassis of the vehicle supports a number of subsystems including a gasoline powered motor, generator, batteries, navigation computer, drive means, and grass cutters. The gasoline engine turns the cutting blades through power transmission means and also turns a generator to charge the batteries. Sufficient energy is supplied from the generator to keep the batteries fully charged during a cutting operation. The cutting mechanism consists of a reel type cutter mounted in a carriage that pivots from the chassis to follow the contour of the ground. The reel cutting blades enable a wide cutting path in a compact arrangement that requires minimal added length to the vehicle. The reel cutters used in the autonomous lawn mower offer safety advantages over conventional rotary blades since the cutting radius is less. This decreases the blade tip velocity and significantly lowers the kinetic energy generated. The reel cutter also has multiple cutting blades spaced closely together making the arrangement less likely than a rotary blade arrangement to chop up objects that get lodged in the cutting area. The autonomous lawn mower is equipped with a smooth housing that facilitates easy cleaning as well as providing protection to the internal electronics of the vehicle. A rear panel, attached with quick release clips, can be removed to provide access to the cutting arrangement.

Since the vehicle is designed to operate unattended, several means are included to stop the vehicle if it encounters obstructions or people. The autonomous lawn mower's navigation system is designed to sense obstacles via both non-contact and contact means and to shut down the vehicle if objects are sensed. Ultrasonic sensors are used to identify objects in the vehicle's immediate path and signal the vehicle to stop before contact is made. If for some reason the vehicle strikes an object, a "cowcatcher" type bumper will try to push it out of the way. If the object is heavy, however, the bumper will deflect and trip a emergency stop switch to halt the vehicle and stop the cutting blades. Contact switches are also placed on the underside of the bumper to sense objects that escape other detection means before they enter the cutting blades. A tilt sensor is used to indicate if the vehicle is on too steep of a grade or if it is tipping. Other safety features include a flashing light and external emergency stop switches. The Emergency stop switches are placed on both sides the vehicle in easily accessible locations to allow individuals to stop the vehicle. A light and audible warning device is mounted on the top of the vehicle to indicate its approach. The light is particularly useful when the vehicle is used during night operation.

If the vehicle stops while cutting, a built in radio system signals the potential problem to a remote radio receiver so a person can be dispatched to remedy the problem.

The autonomous lawn mower uses three principle navigation systems: 1) navigating from a preestablished stored map, 2) following an underground guide path, and 3) navigating by sensing actual underground path references. The stored map is maintained in the autonomous lawn mower's computer memory as a collection of path segments represented as vectors and arcs that describe the cutting route. Also stored therein is terrain and navigation information related to each path segment. This information includes: the grade of lawn surface, the presence of any underground references, the type of reference (if present), and information controlling the operation of the ultrasonic system. During cutting operations the autonomous lawn mower attempts to follow a cutting route one path segment at a time by controlling its drive motors to move the vehicle in either a straight line or arc that prescribe to a desired path segment. By referencing the map database, the autonomous lawn mower obtains knowledge of the approaching terrain so that it can slow down before negotiating difficult cutting areas (i.e. hills, sharp turns, etc.).

The autonomous lawn mower of the present invention also knows when to expect the presence of guide paths and underground references. In these cases, the autonomous lawn mower senses the guide path or reference to accurately determine its coordinate position within a cutting area. After the autonomous lawn mower recalibrates its position, it can travel a predetermined safe distance using only path segment information from the map data base before another recalibration operation is required.

The autonomous lawn mower follows a guide path as a principle navigation system for precise operation. The guide path is buried at a shallow depth beneath the surface of the lawn along the desired route the vehicle will follow. The path is installed by cutting a narrow groove along the desired route that the vehicle will travel. The groove is not deep or wide enough to seriously impact the appearance of the lawn. The guide path, which will typically be a wire or metal tape is laid into the groove. The navigation control system used by the autonomous lawn mower guides the vehicle along the desired travel route defined by the stored map while checking data from the metal sensors to see ensure that the vehicle is centered on the guide path. If the guide path is sensed to the left or right of the vehicle's center, the appropriate position corrections are made to recenter the vehicle. A single continuous guide path can be used on the entire lawn surface or separate sections of guide path may be installed. The stored map provides information on when guide path following should be invoked.

The autonomous lawn mower senses underground metallic references to determine its position at various locations along a cutting route. Unlike guide path following, underground references do not provide constant position information but are used instead to provide intermittant position corrections. Two types of underground references are used: uniquely shaped markers, and spaced objects. A marker is sufficiently large that it can be sensed by several metal detectors at once. As the autonomous lawn mower drives over a marker, the metal detector elements supply data to the autonomous lawn mower's control computer. Data is stored as a two dimensional array. The number of data values in each array row is equal to the number of metal detector elements and the number of array columns is equal to the number of times the sensor elements are sensed. The two dimensional data array is filtered to eliminate bad sensor values by averaging sensor values in adjacent columns. After filtering, the data represents a low resolution image of the buried target. The shape of the marker is compared with stored shapes in the autonomous lawn mower's map data base to locate a match. Once a specific marker is detected, the autonomous lawn mower resets its estimated X and Y position to the Cartesian coordinates assigned to the marker in the map database. The presence of a marker can also be used to signal the vehicle to perform a given function such as disabling the cutting blades.

Metallic objects spaced at preset increments are also used as position references. Objects may be metal disks, plates, or other consistant shaped reference. Each time the vehicle encounters an object it stores its current coordinates as well as the distance the object is sensed from the centerline of the vehicle. Distances between objects reflect unique values that can be correlated to the distances describing the layout and position of objects on the stored map. This procedure allows the vehicles internal position to be recalibrated on the fly. Like guide path following, object identification can also supply data to the vehicle in order to center it on the cutting path. If, for instance, a metal detector element located near the outside of the vehicle senses an object, the direction and distance the vehicle has deviated from the center of the cutting path can be determined.

Guide paths, markers, and spaced objects are sensed using plural metal detector elements. Each sensor element operates in a similar manner to conventional metal detectors in that they contain an excitation and a detection coil. Both coils are excited with turned oscillators and coupled to produce a hetrodyne frequency caused by the two coils resonating at slightly different frequencies. The presence of the metallic guide path or a metallic target under a sensor alters the hetrodyne frequency. This frequency change is monitored and interpreted as the presence of the metallic guide path or target underneath a sensor element. The sensing elements each monitor a small area. The spacing of the sensors is optimized for sensing metallic guide paths and references. In guide path following, the metallic guide path is always sensed by at least one sensor element so that as a signal disappears from one sensor, it will be picked up by an adjacent sensor as long as the guide path is within the sensing area of the metal detector array. These, as well as additional advantages of the present invention, will become apparent from the following detailed description taken along with the several figures.

DETAILED DESCRIPTION OF THE PREFERRED EMBODIMENT

Figure 1A:
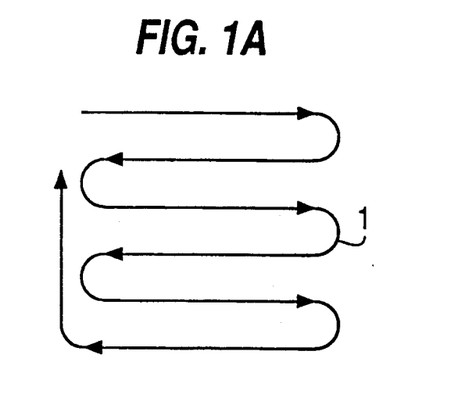
FIGS. 1A–1C represent configurations of metallic guide paths describing entire cutting routes or path segments contained within a cutting route.
Figure 1B:
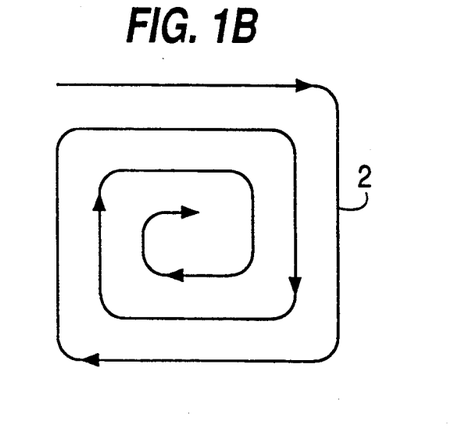
Figure 1C:
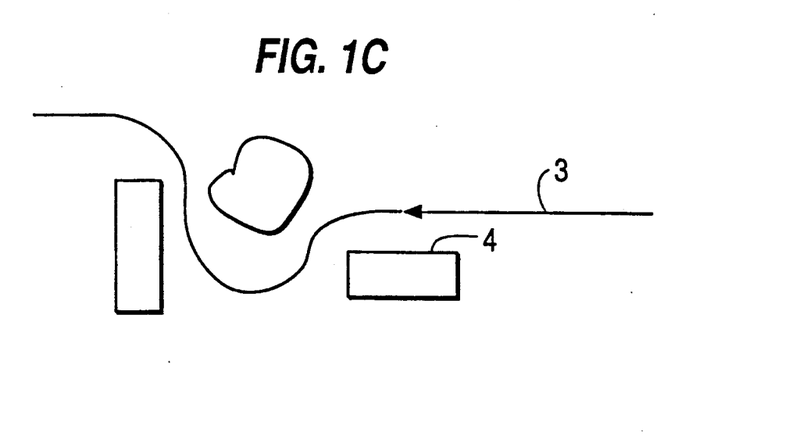

In FIGS. 1A–1C, three different layouts of guide paths are illustrated. Paths 1 and 2 provide a means for the autonomous lawn mower to cover a completely bounded area. Path 1 shows parallel rows followed by 180 degree turns at the end of each row. Path 2 is a concentric guide path layout where the vehicle spirals towards a center point or in an alternate configuration away from a center point. Path 3 represents a short path section installed to enable the vehicle to navigate in a narrow area between obstacles 4. Path sections, as depicted in path 3, may be placed intermittently within a cutting area.

Figure 2A:
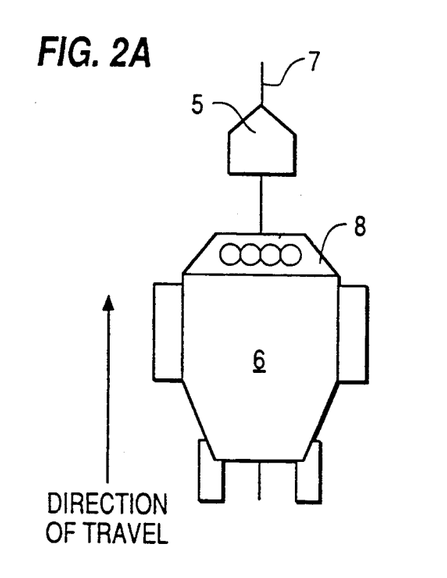
FIGS. 2A and 2B represent, by way of an illustrated example and table, the autonomous lawn mower identifying a uniquely shaped metallic marker as a means of underground metallic referencing.
Figure 2B:
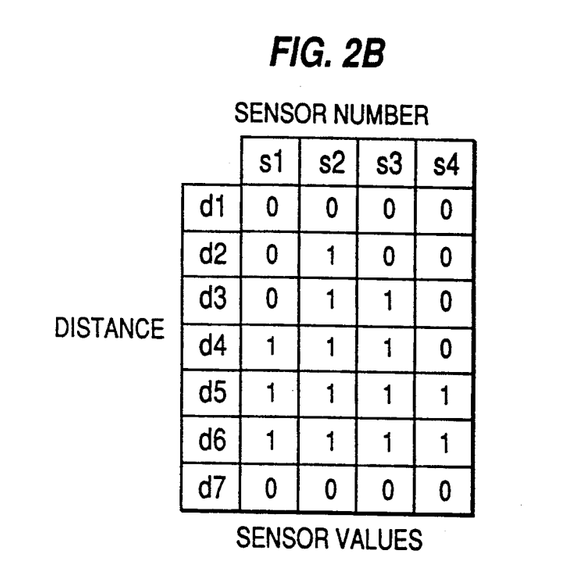

FIGS. 2A and 2B depicts the basic concept of navigating by identifying uniquely shaped markers as position references. A marker consists of metallic plates cut into unique shapes. The preferred method of identifying a marker is to first allow the vehicle 6 to center itself along a section of guide path 7 prior to sensing the marker 5, then, with the vehicle centered, drive over the marker 5 collecting data from the metal detector elements.

The complexity of the target that can be identified depends on the amount of data collected in the 2-D array which is dictated by the following relationship:

$$SV = N\, L/d \text{ where}$$

SV is the number of sensor values contained in a two-dimensional array describing the shape of the target;

N is the number of inductive sensors in an array;

d is the distance the vehicle travels between sensor array updates;

L is the path length the vehicle travels while the sensor elements within the metal detector array are being updated.

FIG. 2B contains a table showing the related sensor data from metal detector elements 8. Typically, data will be sampled several times before inserting a value into an array value in an effort to filter out erroneous values. The autonomous lawn mower's navigation controller uses the marker data to correlate the shape of target to a mathematical description of a similar marker stored in the map database. If a target is recognized from the map database the vehicles position can be recalibrated. Markers can also be used for other functions in addition to position referencing. A given shape marker can be a signal for the vehicle to perform a given function.

Figure 3:
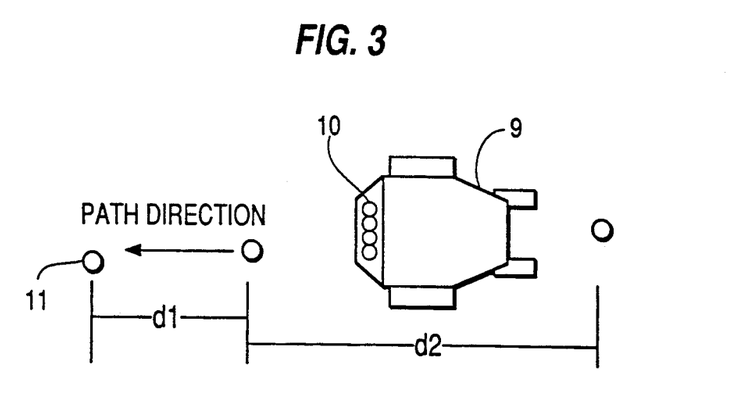
FIG. 3 represents, by way of an illustrated example, the autonomous lawn mower sensing objects at preset distances as another form of underground metallic referencing disk detection.

In FIG. 3, the autonomous lawn mower 9 detects underground objects 11 spaced at preset distances d1 and d2. The distance values can be correlated to stored map information depicting arrangements of stored objects to determine if a correlation exists. If so, the vehicle position can be recalibrated to the stored map. Objects spaced sequentially along a path in an established pattern can be decoded to signal a given operation as well as a position reference. The metal detector array 10 can sense the objects if the vehicle has deviated from the center of the path where the objects are installed. As objects are sensed by the outside metal detector elements 10, the autonomous lawn mower determines the appropriate correction to recenter itself on the cutting path.

Figure 4:
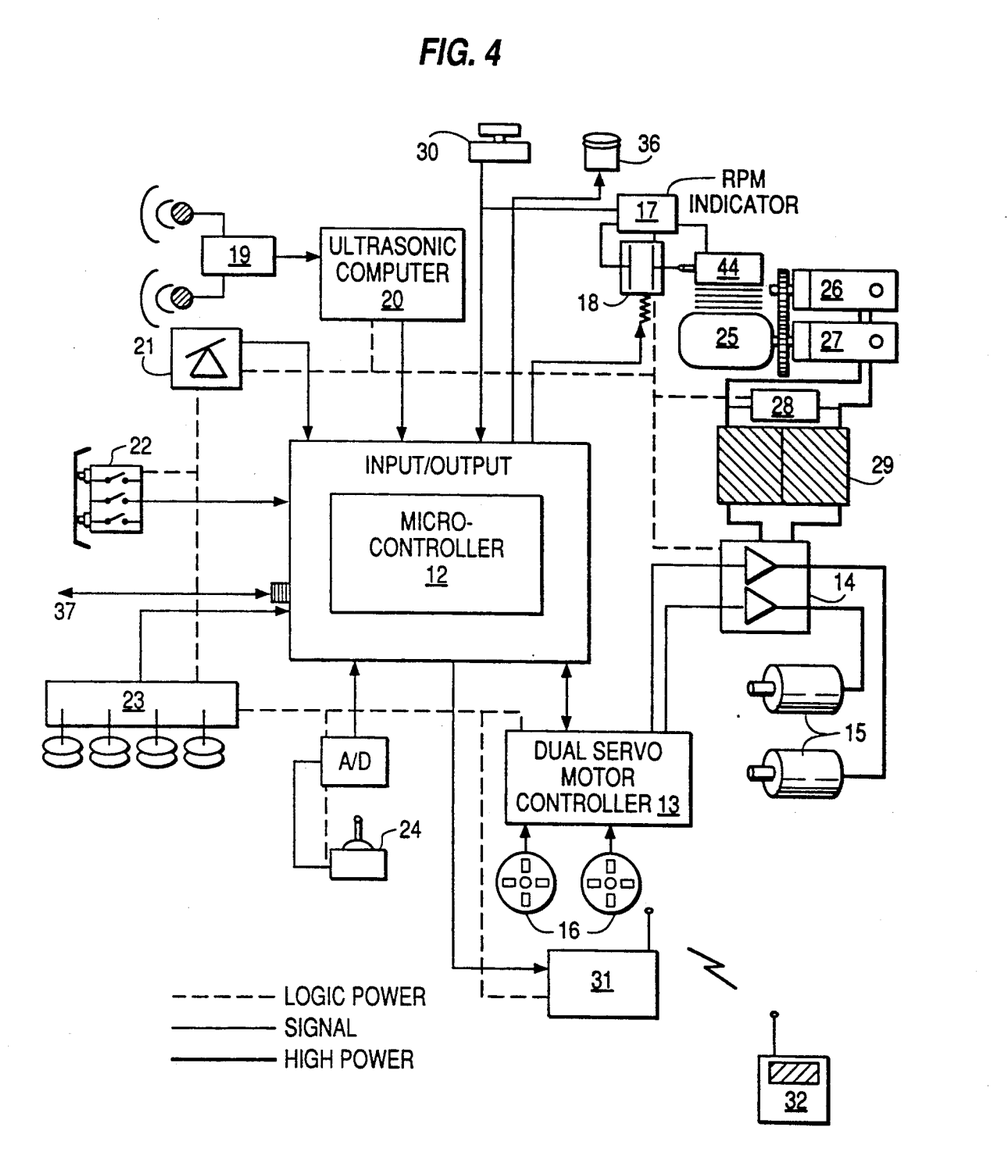
FIG. 4 represents a functional block diagram of the electronic subsystems used by the autonomous lawn mower as well as the direction of data flow.

FIG. 4 is a block diagram of the the autonomous lawn mower's major electronic subsystems. The autonomous lawn mower's brain consists of a microcontroller 12 containing non-volatile memory, random access memory, a microprocessor, and input/output data communications ports. The microcontroller controls the dual axis servo motor controller 13, which in turn controls the two drive amplifiers 14 that power the two drive motors 15. Wheel rotational sensor 16, provides position and angular velocity information to the dual axis servo controller 13 and the microcontroller 12. The dual axis servo motor controller uses a current limiting technique to maintain the vehicle's speed within a safe operating range. A engine RPM indicator 17 is monitored by the microcontroller to sense if the engine has bogged down or stalled. If the engine begins to slow down as a result of thick grass, the microprocessor automatically slows down the speed of the lawn mower until the engine begins to respond normally again. Obstacles in the path of the vehicle are sensed with ultrasonic sensors 19 and an ultrasonic computer 20. The ultrasonic computer consists of a dedicated microprocessor to collect and analyze data from the ultrasonic sensors 19. The ultrasonic computer informs the microcontroller with values representing the distance to the nearest object from the center of the vehicle. A tilt sensor 21 updates the microcontroller with the angle of the vehicle and senses if the vehicle is in danger of tipping over. Several contact switches 22 are mounted to the surface and underside of the front bumper 54 to sense impact with obstacles. The bumper contact switches 22, mounted underneath the bumper, are used to sense if the vehicle is trying to climb over an obstacle. The metal detector elements 23 sense the position of the underground metallic references and the metallic guide path. A spark enable relay 18 is opened by the microcontroller 12 to halt the engine and attached cutting blades if the vehicle encounters a blocked path, the vehicle is lost, if a bumper switch 22 is opened, an emergency stop switch 30 is depressed, the vehicle tilt sensor 21 indicates an unsafe operating state, or some other system failure. The emergency stop switches are directly wired to the spark enable relay 18. A starter 26, powered from the batteries 29, is used to start the engine 25. The engine, once running, drives via a power transmitting means, the cutting blades 44 as well as a generator 27 that recharges the batteries 29. Drive power for the servo amplifiers 13 is taken directly from the batteries 29. Logic power for all sensors and controllers is generated from a DC/DC converter 28 connected to the batteries 29.

To guide the autonomous lawn mower to its starting position on a lawn, and to drive the vehicle through a cutting route during a learning operation, an operator pendant 24 is used. The operator pendant includes a joystick or similar means to control the speed and direction of the vehicle and function buttons to enter data into the microprocessor 12. The manual control pendant can be attached directly to the servo amplifier to power the vehicle even if the microcontroller is inoperative. A radio transmitter 31, is used to communicate with a self contained, off-board receiver 32. The receiver contains a panel to display information corresponding to the operating status of the vehicle and the nature of a problem if it occurs. A safety light and audible warning indicator 36 are activated by the microprocessor to warn individuals of the vehicles approach. A diagnostic communications port 37 enables a data input terminal or other computer to communicate data with the microprocessor 12.

Figure 5:
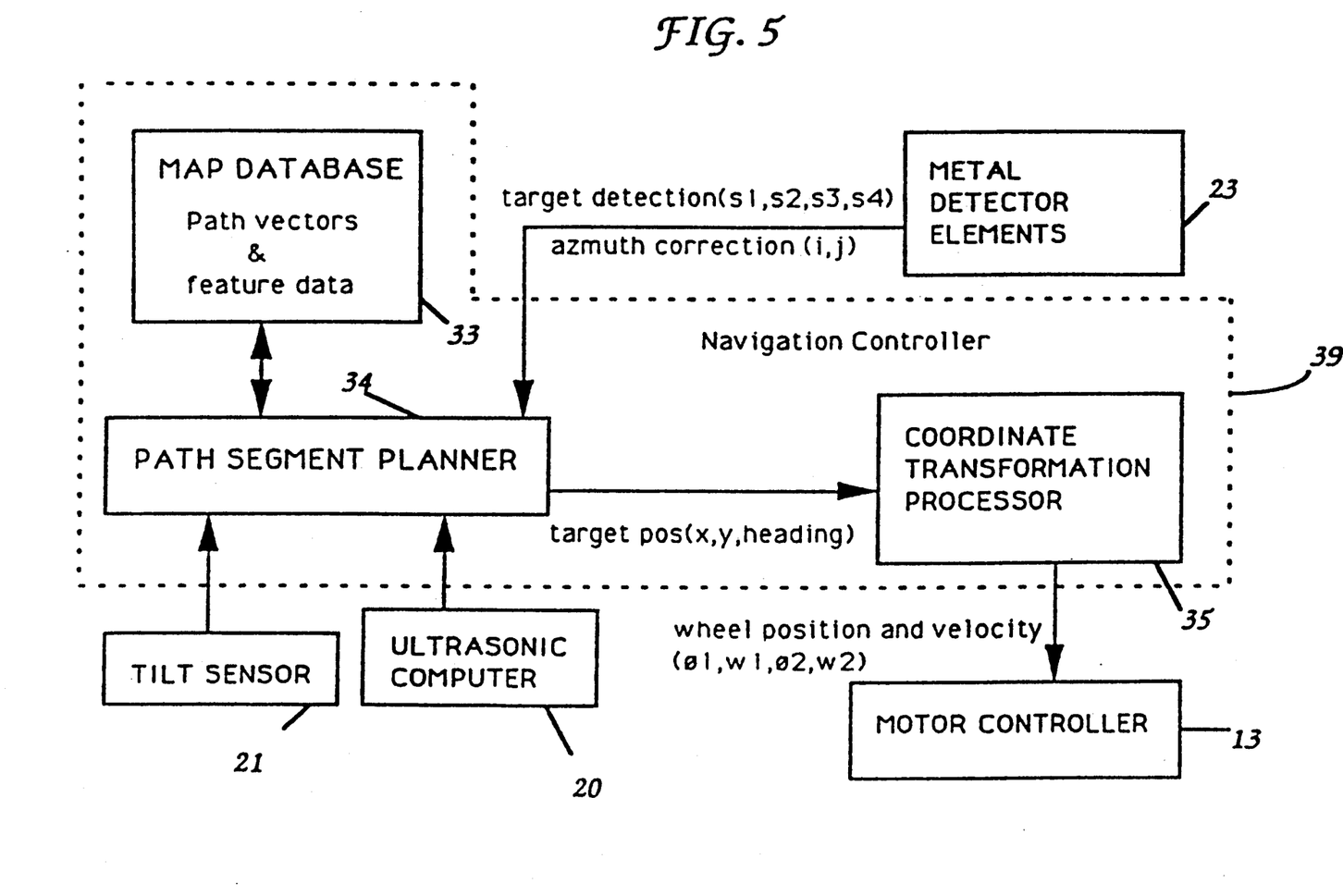
FIG. 5 represents a simplified block diagram of the Navigation controller showing the major functional modules.

Referring to FIG. 5 the autonomous lawn mower guides itself along the cutting route using a microprocessor-based navigation controller 39 consisting of a map database 33, a path segment planner 34, and a coordinate transformation processor 35. The navigation controller is implemented with the microcontroller 12. The map data base is stored on-board the vehicle in non-volatile electronic memory such as EPROMs, EEPROMs, Static Ram, or similar means. The functional modules of the navigation controller (i.e. the map database 33, path segment planner 34, and coordinate transformation processor 39) may be implemented as software routines. Alternately, the functional modules could be implemented using specialized electronic hardware. Sensory data from the metal detector elements 23, tilt sensor 21, and the ultrasonic computer 20 serves as inputs to the navigation controller 39. Drive wheel rotational position information from the wheel position encoders 16, monitored by the dual servo motor controller 12, also serve as inputs to the microcontroller. Outputs from the navigation controller 39 drive the dual motor controller 13 to command the autonomous lawn mower's drive motors 15 to a new target position. The map database 33 contains a list of path vectors, arcs, and terrain feature data which describe the cutting path for a given lawn. The information from the map database 33 is loaded into the autonomous lawn mower's memory prior to the beginning of a cutting operation. Alternate map databases can be accessed by the autonomous lawn mower so that it can cut several different lawns.

The map database 33 is created by the autonomous lawn mower after a cutting route is planned and underground metallic references are installed. The autonomous lawn mower is placed into a learning operation by instructing the microcontroller 12 from the operator pendant 24. During the learning mode, the autonomous lawn mower is manually driven through the desired cutting path. If underground guide paths are used, the autonomous lawn mower automatically follows the guide path without external manual control. If underground metallic references are used (i.e. uniquely shaped markers 5 or objects 11), the autonomous lawn mower recognizes them and automatically stores their position. The autonomous lawn mower remembers all turns that it makes as well as the distances between the turns and creates a map database. The navigation controller 39 accomplishes this by transforming the drive wheel rotational position data from wheel position encoders 16 into the vehicles' current Cartesian coordinate position using the coordinate transformation processor 35. The data generated from the coordinate transformation processor 35 consists of X and Y coordinates as well as a heading. The coordinate transformation processor 35 is capable of reducing the amount of Cartesian data by converting the coordinates to path vectors and arcs. During the learning mode, the autonomous lawn mower also collects data from the tilt sensor 21 and ultrasonic sensors 19 via the ultrasonic computer 20. The navigation controller relates the data from these sensors to specific path segment data (i.e. vectors and arcs) in the map database. In this manner, the autonomous lawn mower's database at the completion of the learning operation contains path segments (vector and arcs) describing the entire cutting route of the vehicle, the type and position of underground metallic references or guide paths, the anticipated slope of the terrain, and the distance to the nearest fixed ultrasonic target for all stored position vectors.

After the autonomous lawn mower has learned a lawn surface it can cut a lawn autonomously. During autonomous operation, the autonomous lawn mower's path segment planner 34 uses the path segment data (vectors and arcs) to control the rotation of the drive wheels to follow the desired cutting route. This is accomplished by processing the path segment data with the coordinate transformation processor to generate wheel rotation angles and velocities to control the drive wheels 41E. From the map database, the path segment planner 34 knows when to expect turns or the presence and type of underground metallic reference so it can adjust its speed accordingly. As underground metallic references such as objects 11 or uniquely shaped markers 5 are sensed, the path planner attempts to make a correlation with marker locations stored on the map database 33 and it recalibrates the vehicle's position if a correlation exists. When a guide path is encountered, the autonomous lawn mower attempts to center itself on it. When the autonomous lawn mower does not sense the presence of underground metallic references or guide paths that it expects from the map database, it considers itself lost and shuts down. For example, if the vehicle is navigating using guide path referencing and the guide path being sensed does not agree with the path segment stored in the map database, the autonomous lawn mower will sense it is off its path. Similarly, if the map database expects a flat grade but the tilt sensor shows that the vehicle is ascending a grade, the autonomous lawn mower will shut down if the discrepancy continues over a preset distance. The map data base 33 also stores the distance to the nearest target from the ultrasonic sensors along a given path vector. This helps prevent false obstacle detection since the vehicle can change its sensitivity threshold at different locations on the cutting surface. Thus, if the autonomous lawn mower is cutting along a hedge, the allowable distance to nearest target may be set very low to keep the vehicle from stopping unnecessarily.

Figure 6:
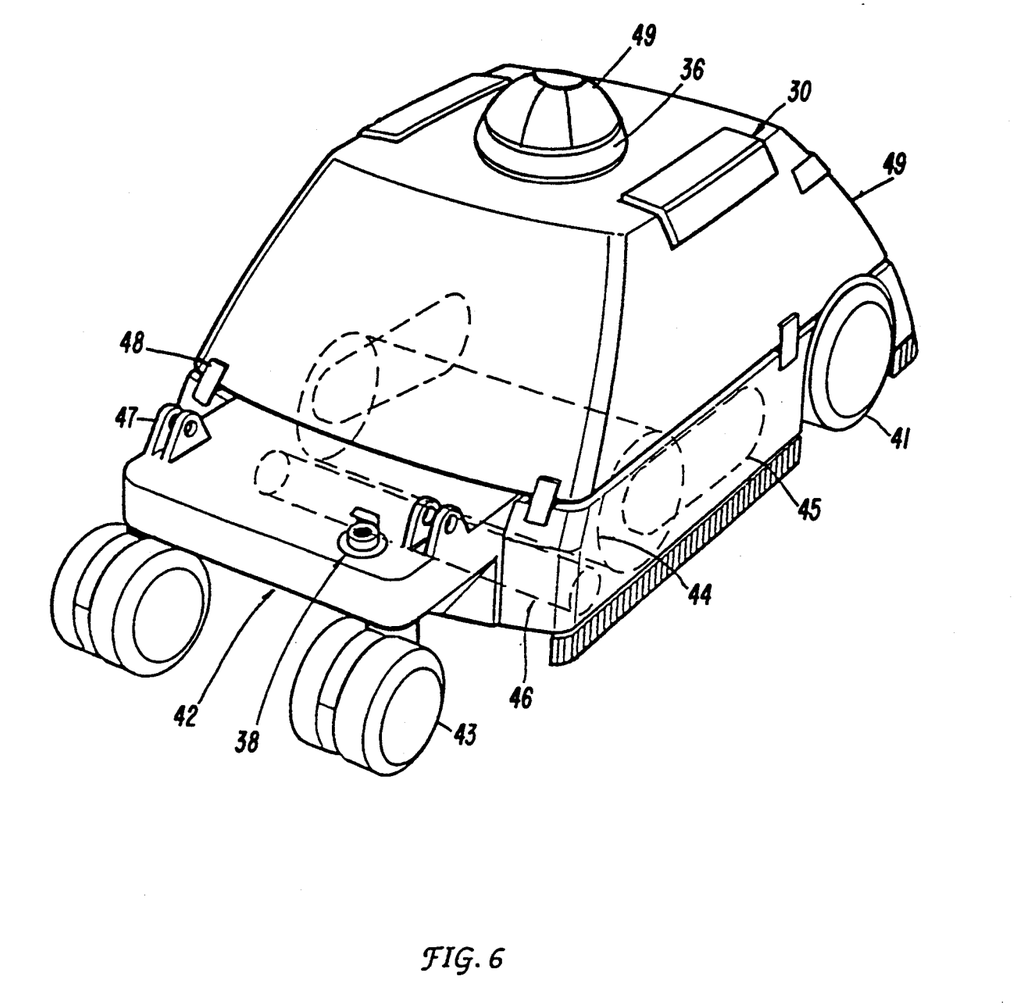
FIG. 6 represents a rear perspective view of the autonomous lawn mower depicting the basic carriage design and position of the cutting blades.

FIG. 6 illustrates, without mechanical details, the basic physical layout of the autonomous lawn mower. The chassis 42 is the vehicles central structural support that holds the drive components and electronics. The reel cutting mechanism 44 is positioned underneath the carriage 42 between the drive wheels 41 and rear swivel wheels 43. The cutting mechanism 44,45,46 is attached with appropriate linkage system 45 to allow it to float up and down and to pivot side to side with respect to the center line of the vehicle. Roller 26 keeps the cutting mechanism in contact with the ground. The linkages 45 allow the cutting blade to stay parallel to the lawn surface when the vehicle is operating on uneven terrain. The roller 46 can be adjusted in a conventional manner to provide different cutting heights. A protective cover 49 is attached to chassis 42 by quick release clamps 48. Opening the clamps 48 allows the cover 49 to be easily removed to clean the cutting mechanism or provide access to other components. The cover 49 is smoothly shaped to facilitate cleaning and washing. A light and audible indicator 36 is mounted on the top of the vehicle so that can be viewed from any angle. Large Emergency stop buttons 30 are also placed on top of the vehicle and are easily visible and accessible. Clevis brackets 47, mounted to the chassis 42, provides attach points for an attachable handle for use when the vehicle is being manually controlled. An electrical connector 38 is also provide to provide power and control signals for the operator pendant 24. A radio antenna 59 transmits signals to the off-board receiver 32.

Figure 7:
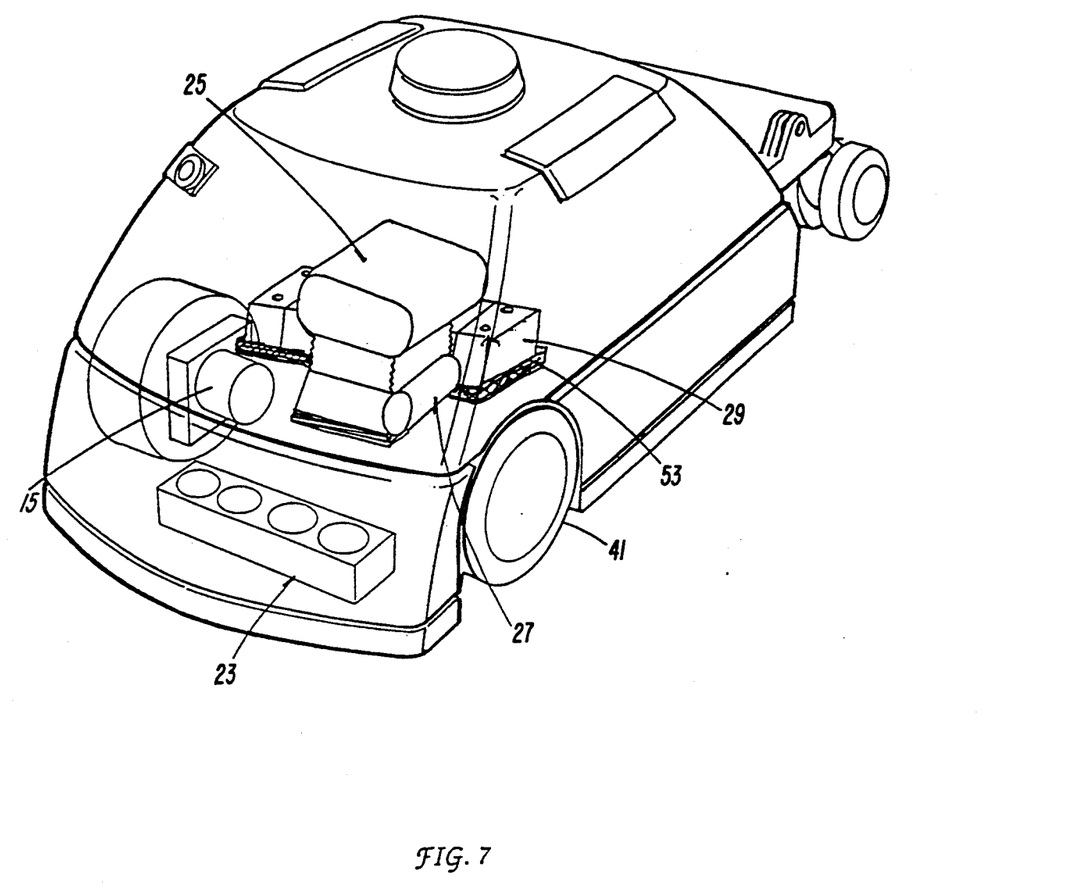
FIG. 7 represents a front perspective view of the autonomous lawn mower with the front panel removed to reveal the basic positioning of the major drive components and the metal detector sensors.

FIG. 7 depicts the relative positions of the major drive components and the metal detector elements. Each drive wheel 41 is driven by a servo motor 15 and associated gearbox 40. The motor and gearbox are modular to allow easy replacement. The metal detector elements 23 are mounted near the front of the vehicle between the drive wheels. The gasoline engine with attached starter and generator is mounted on top of the chassis 41. The batteries 29 are contained in a protective pan mounted above the front wheels. The gasoline motor, batteries, and servo motors, which contribute largely to the weight of the vehicle, positioned over the drive wheels. This arrangement provides traction and helps prevent wheel slippage.

Figure 8:
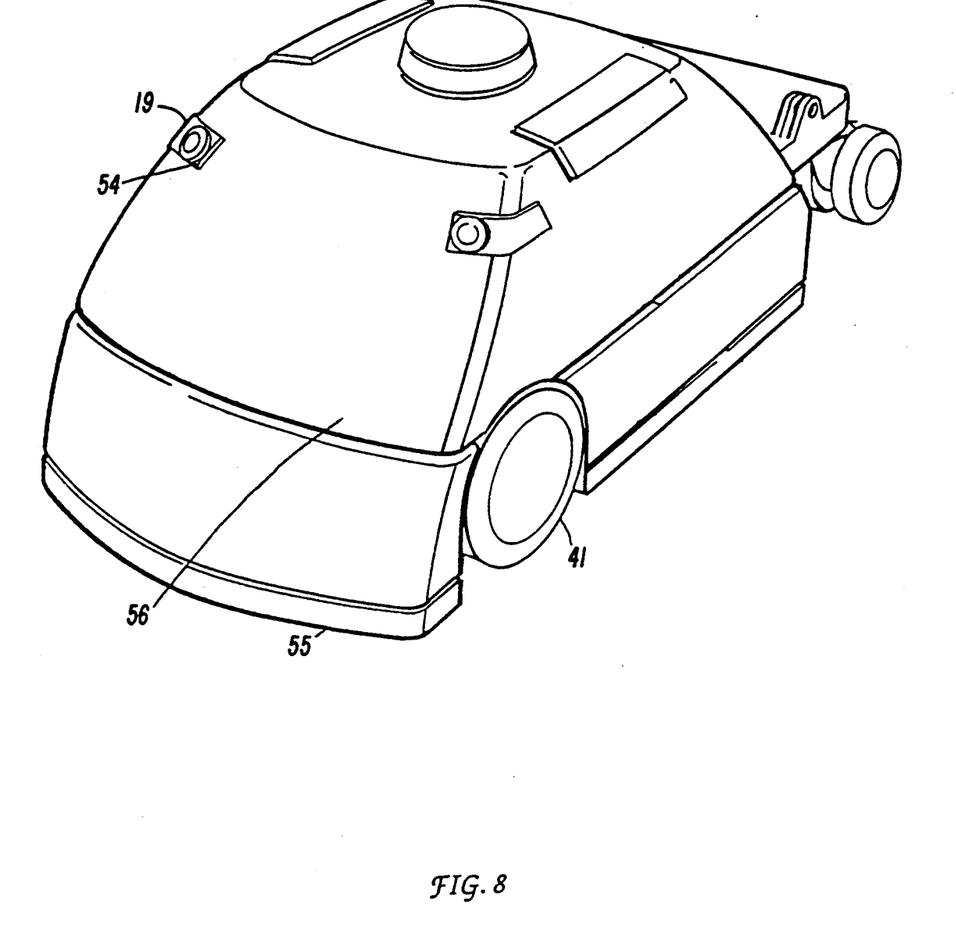
FIG. 8 represents a front perspective view of the autonomous lawn mower showing the housings, front bumper and location of ultrasonic sensors.

The front view of the autonomous lawn mower is illustrated in FIG. 8. Therein, two ultrasonic sensors 19 are mounted in holding brackets 54 which penetrate through the protective front cover 56. The holding brackets maintain the ultrasonic sensors at the correct angle to view the path in front of the vehicle. The front bumper 55 is attached to the front of the chassis and extends the width of the vehicle. It is constructed of a flexible material that deforms when impacted by an object. Contact switches inside the bumper open as the bumper deforms to indicate that a obstacle has been encountered. The shape of the bumper is curved in a manner to push small objects to either side of the vehicle. The bumper also extends close to the lawn surface to prohibit objects from siding underneath the vehicle.

Although the foregoing invention has been described in some detail by way of illustration and for purposes of clarity of understanding, it is understood that certain changes and modification may be practiced within the spirit of the invention. Therefore, the present invention is to be limited only by the scope of the appended claims.

We claim:

1. An autonomous lawn mower operative to self navigate along a prescribed path in accordance with stored route information compared with information from position markers spaced along the prescribed path comprising:

a body for supporting components of the lawn mower;

a power generation means supported by said body for supplying power to the lawn mower;

a plurality of wheels supporting said body;

at least one cutting means driven by said power generation means, with said cutting means extending below said body;

central processor means mounted on said body which includes stored route information including identity and position information indicative of the identity and position of said spaced position markers;

sensing means mounted on said body and operative to sense the presence of a position marker and the position of said position marker relative to said body, said sensing means being connected to said central processor means and operating to transmit a data signal to said central processor means when a position marker is sensed, said processor means operating in response to a data signal from said sensing means to compare said data signal with the stored identity and position information for said spaced position markers to determine an actual position, and control means mounted on said body and connected to said central processor means for controlling the movement of the lawn mower along the prescribed path, said central processor means operating to provide a correction signal to said control means in response to a deviation of said actual position from the prescribed path, said control means operating to correct the travel of the lawn mower in response to a deviation signal.

2. The lawn mower as defined in claim 1, wherein said position markers are passive underground references positioned along the prescribed path.

3. The lawn mower as defined in claim 2, wherein said passive underground references are metallic.

4. The lawn mower as defined in claim 3, further comprising a plurality of spaced metal detectors mounted on said body for detecting the presence of said metallic passive underground references.

5. The lawn mower as defined in claim 4, wherein said underground passive references include an elongated substantially continuous strip which designates a section of the prescribed path defined by the stored route information, said strip being sensed by said metal detectors to guide the lawn mower.

6. The lawn mower as defined in claim 4, wherein said underground passive references include a plurality of differently shaped metallic disks positioned about an area to be mowed, said shape of said disks being sensed by said sensing means to identify a predetermined position of the lawn mower during a mowing cycle.

7. The lawn mower as defined in claim 1, further comprising a tilt sensor mounted on said body for determining the attitude of the body in comparison to the horizontal, and means for stopping the power generation means in response to a sensed attitude greater than a predetermined acceptable attitude.

8. The lawn mower as defined in claim 1, further comprising a bumper arrangement for diverting small objects out of the path of the lawn mower, said bumper arrangement further comprising means for stopping the power generation means in response to said bumper arrangement contacting oversized objects.

9. The lawn mower as defined in claim 1, wherein said power generation means is an engine and further comprising an engine speed indication means for monitoring the engine speed and providing an engine speed signal to said central processor means, said central processor means operating in response to variations in said engine speed signal to vary the speed of said lawn mower.

10. The lawn mower as defined in claim 9, further comprising a relay placed in series with a spark plug of the engine to stop the engine in response to the presence of an abnormal operating condition.

11. The lawn mower as defined in claim 10, further comprising a warning means for indicating the occurrence of said abnormal operating condition.

12. The lawn mower as defined in claim 11, further comprising signal generation means for generating a radio signal indicative of the presence of the abnormal condition, said signal being received by a remote receiver.

13. The lawn mower as defined in claim 1, wherein the position markers are uniquely shaped metallic markers installed along the prescribed path, the actual position of the vehicle on the prescribed path being determined by:

said sensing means including an array of sensors operating to collect data at fixed distance increments over a predetermined area where a position marker is prescribed by said stored location data to exist;

said processor means being operative to store the data in an electronic memory as a 2-D array in which the data contained in the 2-D array is governed by:

$SC = N \, L/d$ where:

SV is the number of sensor values contained in the 2-D array describing the shape of the marker;

N is the number of sensors in an array;

d is the distance the lawn mower travels between sensor array updates; and

L is the path length the lawn mower travels;

the processor means operating to produce a low resolution image depicting the shape of said position marker; and further operating to match the shape of the position marker to stored identity and position information that symbolizes a predetermined landmark of known coordinates.

14. The lawn mower as defined in claim 1 wherein said stored route information in said central processor means includes terrain feature data, said central processor means operating in response to said terrain feature data to provide speed control signals to said control means, said control means operating in response to said speed control signals to vary the speed of said lawn mower in accordance with said terrain feature data.

15. The lawn mower as defined in claim 14 where a tilt sensor means is mounted on said body, said tilt sensor means operating to provide tilt data signals to said central processor means indicative of the attitude of the body relative to the horizontal, said processor means operating to compare said tilt data signals to the stored terrain feature data for the location of the lawn mower and to terminate operation of the lawn mower when the tilt data signals fail to correspond with the stored terrain feature data.

16. The lawn mower as defined in claim 1, wherein said central processor means operates in response to a failure to receive a data signal which corresponds to stored identity and position information to terminate operation of said lawn mower.

17. The lawn mower as defined by claim 1, wherein drive means are provided on said body to drive at least one of said wheels, said drive means being connected for control by said control means, and wheel position encoding means are provided to sense the rotational position of each driven wheel, said wheel position encoding means operating to provide drive wheel rotational position data signals to each driven wheel to said central processor means.

18. The lawn mower as defined by claim 1, wherein two of said wheels are mounted on said body in spaced opposed relationship and drive means are provided on said body for driving said wheels, said drive means being connected to said control means for control thereby and including a separate electric motor for driving each said wheel, the speed at which each said electric motor drives an associated wheel relative to the speed of the remaining driven wheel being varied by said control means to maintain the mower on said prescribed path, said central processor means operating to provide correction signals to said driven wheel on the body to control the path which the mower follows.

19. The lawn mower as defined by claim 18 wherein said driven wheels are rotatable but fixed and non-pivotable relative to said body.

20. The lawn mower as defined by claim 19 wherein wheel position encoding means are provided on said body to sense the rotational position of each driven wheel, said wheel position encoding means operating to provide drive wheel rotational position data signals for each driven wheel to said central processor means.

21. The lawn mower as defined in claim 20, wherein central processor means operates in response to a failure to receive a data signal which corresponds to stored identity and position information to terminate operation of said lawn mower, and wherein said stored route information in said central processor means includes terrain feature data, said central processor means operating in response to said terrain feature data to provide speed control signals to said control means which cause said control means to vary the speed at which each electric motor drives an associated wheel in accordance with said terrain feature data.

22. The lawn mower as defined in claim 1, further comprising a safety means mounted on said body, said safety means including at least one ultrasonic sensor for sensing the presence of obstacles in the path of the lawn mower and means for stopping said power generation means in response to an obstacle being sensed.

23. A method for controlling the operation of an autonomous vehicle in accordance with stored route information compared and updated by spaced position markers and conditions occurring along a prescribed path, said method including:
 providing a self propelled vehicle having a central processor for receiving and storing data;
 initially providing reference data to said central processor for storage therein which includes data defining the location of said spaced position markers and data defining the prescribed path to be followed as well as conditions to be encountered at predetermined positions along the path;
 initiating the vehicles motion along the prescribed path under the control of the stored data defining the prescribed path;
 monitoring an actual position of the vehicle along the prescribed path by sensing the position of the vehicle relative to said position markers and updating the actual position in said processor means when a position marker is sensed; and
 adjusting the vehicle's position with respect to the prescribed path if the actual position deviates from the prescribed path.

24. The method as defined in claim 23, wherein the step of monitoring the actual position of the vehicle includes comparing the sensed position marker location with the stored data defining the location of the sensed position marker.

25. An autonomous lawn mower operative to self navigate along a prescribed path in accordance with stored route information which includes terrain feature data comprising:
 a body for supporting components of the lawn mower;
 a power generation means supported by said body for supplying power to the lawn mower;
 a plurality of wheels supporting said body;
 central processor means mounted on said body which includes said stored route information; and
 control means mounted on said body and connected to said central processor means for controlling the movement of the lawn mower;
 said central processor means operating in response to said stored terrain feature data to provide speed control signals to said control means, said control means operating in response to said speed control signals to vary the speed of said lawn mower in accordance with said stored terrain feature data.

26. The lawn mower as defined in claim 25 wherein a tilt sensor means is mounted on said body and is connected to said central processor means, said tilt sensor means operating to provide tilt data signals to said central processor means indicative of the attitude of the body relative to the horizontal, said processor means operating to compare said tilt data signals to the stored terrain feature data for the location of the lawn mower along the prescribed path and to terminate operation of the lawn mower when the tilt data signals fail to correspond with the stored terrain feature data.

27. The lawn mower as defined in claim 26 wherein said central processor means is connected to said power generation means and operates to terminate operation of said power generation means when said tilt data signal indicates that the attitude of the body is such that the lawn mower is in danger of tipping over.

28. The lawn mower as defined in claim 27 wherein a cutting means is mounted on said body, said power generation means including a motor connected to drive said cutting means and motor RPM sensing means connected to said motor, said motor RPM sensing means being connected to said central processor means and operating to provide a motor speed signal to said central processing means, said central processing means operating in response to a drop in motor speed to cause said control means to reduce the speed of said lawn mower.

* * * * *